United States Patent Office 3,170,968
Patented Feb. 23, 1965

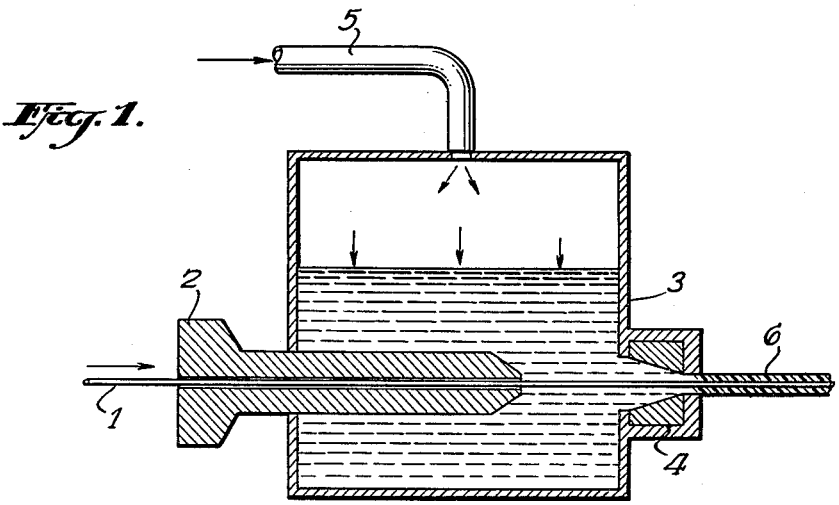
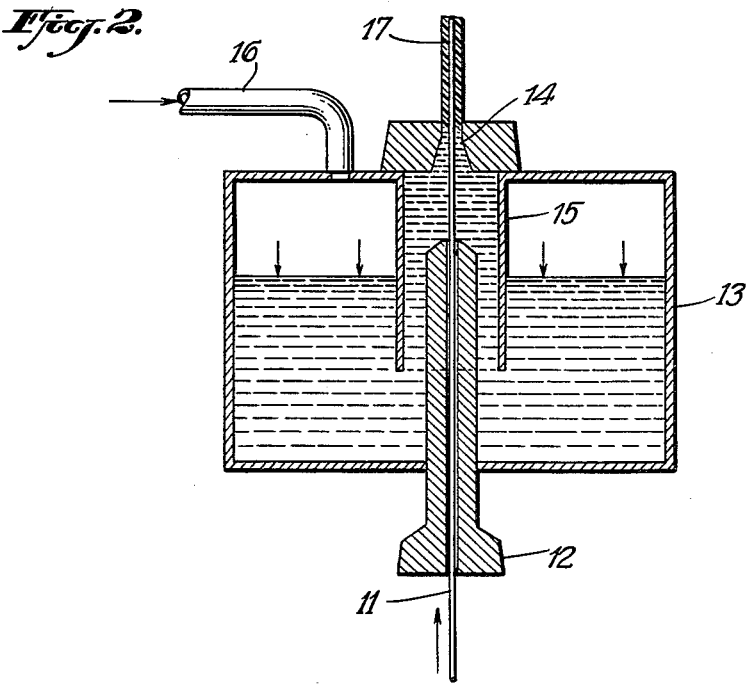
INVENTORS.
MITSURU ROKUNOHE.
ZENZO YOSHIDA.
MIKIO HANZAWA.
YOSHIO HAMADA.
BY HIROSHI MIYAZAKI.
SOTARO HIDA.
ATTORNEYS.

3,170,968
METHOD OF MANUFACTURING CELLULAR INSULATED WIRE
Mitsuru Rokunohe, Zenzo Yoshida, Mikio Hanzawa, Yoshio Hamada, Sotaro Hida, and Hiroshi Miyazaki, all of Tokyo, Japan, assignors to Nippon Telegraph & Telephone Public Corporation, Tokyo, Japan, a corporation of Japan
Filed Mar. 5, 1962, Ser. No. 177,376
Claims priority, application Japan, Mar. 31, 1961, 36/10,763
1 Claim. (Cl. 264—45)

The invention relates to a modification of the method of manufacturing a wire insulated with a coating of foam-like synthetic resin disclosed in United States of America application Serial Number 810,569 and now Patent No. 3,068,126, entitled "Method of Manufacturing Bubble Insulated Wire," filed on May 4, 1959.

In the application mentioned above, the inventors disclosed a method of manufacturing wire insulated with a coating of foamed synthetic resin which method comprises: coating the wire with a solutoin, of which a crystalline synthetic resin is the main component, and thereafter cooling said coated wire at the temperature below the gelation point of said solution and then reheating the coated wire in a kiln to cause the generation of fine separated cells of small size within said coating.

As the specification of application No. 810,569 shows, the original invention affords a method in which the process of coating with resin takes place under normal atmospheric pressure. That is to say, the coating is carried out under a normal pressure and with the solution, of which the ratio of mixing of resin with the solvent is 1:2–2.5 in case of coating with resin of low molecular weight and 1:5–8 for the coating with resin with high molecular weight, thus applying varied ratios of resin and solvent in conformity with the quantity of molecular weights of resins, to obtain a solution with proper viscosity for coating.

However, when a resin with low molecular weight, such as polyethylene produced in a high pressure process is to be employed, the structure of the layer of coating is kept unbroken even when a part of the solvent is evaporated and removed therefrom during the process of cooling down to the temperature below that of gelation of the resin solution, the ratio of solvent to the resin being set from 2 to 2.5 times the latter by weight.

When a resin with high molecular weight, such as polyethylene produced after medium or low pressure process is to be used, it is recommended to lower the viscosity as low as the one proper for the coating with the solution in which the solvent is as much as 5 to 8 times the resin by weight.

When the proportion of solvent to resin increases and at the same time the quantity of the solvent increases, the time for causing the crystallization, after removing the solvent, is increased, even when the solvent is cooled below the gelation point after the coating. That is to say, it requires more time for the cooling process thus reducing the speed of production. Further, it brings about a disadvantage in that the coated skin around the wire shrinks because of a sudden evaporation of the solvent that had been stored within the layer up to the moment of cooling and thus it builds folds or flat spots on the surface of the coating, and therefore even covering with the layer around the wire cannot be achieved.

The present invention affords a method wherein, for coating a bare wire with solution, of which the main component comprises crystalline synthetic resin, the proportion by weight of solvent to resin being less than 2.5 times the latter in cases when the resin with higher molecular weight is to be employed, and by carrying out the coating process under some pressure (over 50 g./cm.$^2$) the formation of folds and uneven flat spots on the surface of coating can be avoided, notwithstanding the process of removing the solvent through cooling of the coating to the temperature below the gelation point of the solution. In this way, the core is positioned at the center of the layer-covered wire. We are enabled thus to achieve uniformity of the covering layer and also to increase the manufacturing speed of the wire.

The crystalline synthetic resins with high molecular weight referred to in the present explanation are represented by polyethylene produced after medium and low pressure processes and polypropylene with molecular weights exceeding about 50,000.

In the following some examples of the invention will be described referring to the accompanying drawings:

FIG. 1 shows an arrangement in which bare wire is passed through in horizontal direction.

FIG. 2 shows another arrangement in which bare wire is passed through in vertical direction.

In FIG. 1, bare copper wire is marked 1, 2 is a nipple, 3 is a tank for resin solution, 4 is a die, 5 is a pipe for supplying the tank with compressed air, and 6 is layer of coating resin. In this arrangement the wire insulated with even and uniform polyethylene coating with fine cells ranging in diameter from 10 to 30 microns obtained by leading the bare wire at the speed of 16 to 24 meters per minute through the nipple 2 and die 4 attached to the tank 3 of the solution composed of the mixture of medium pressure processed polyethylene (the inventors used for experiment the polyethylene Marlex No. 5000, Type 3 of Philip Inc., U.S.A.) and solvent at the proportion of 1:2–2.5 by weight, heating to the temperature of around 140° C. to get complete flux, and then cooling the wire to room temperature and thereafter passing it through the kiln for reheating. The proper pressure to be given to the solution within the tank 3 is about 50 g./cm.$^2$ when the proportion by weight between the resin and the solvent is 1:2.5 and about 80 g./cm.$^2$ in case the proportion mentioned above is 1:2.0.

When the pressure was reduced to less than about 50 g./cm.$^2$, the quantity of the coating layer 6 around the wire 1 was poor and a perfect layer was not formed. To cover the surface of the wire completely under the inner pressure of less than 50 g./cm.$^2$, it was necessary to increase the quantity of the solvent by over three times the resin, but in this case the surface of the coating resin layer 6 was found uneven and not smooth.

Thus it may be concluded that the right proportion in weight to be chosen for mixing resin and solvent is to be under 1:2.5, and the right pressure within the tank over 50 g./cm.$^2$.

In FIG. 2, the numbers 11–14 correspond to 1–4 in FIG. 1. 15 is a cylinder installed within the resin solution tank 13 at its upper part, 16 is a pipe for pressure supply and 17 is the resin layer that coats the wire. When wire insulated with synthetic resin is to be manufactured by means of such an arrangement as shown in FIG. 2, the wire 11 is passed at the speed of 14–24 meters per minute from the nipple 12 toward the die 14 through the cylinder 15 filled with the resin solution heated to the temperature of 140° C. in the resin solution tank 13 kept under inner pressure of 50 g./cm.$^2$. The solution in this case was at the weight proportion of 1:2.5 crystalline polyethylene (product of an Italian manufacturer, Montecatini S.A., was used) to xylene as solvent. The wire was then cooled to room temperature by means of a ventilator after the coating in said process and passed through the reheating kiln. The wire thus processed had a coating layer 17 of resin with fine separated cells of which diameters varied from 10 to 30 microns and the percentage of generation of cells was from 20 to 30% and the coating was of even quality.

The foregoing embodiment was described in connection with polyethylene and polypropylene. But this method is not limited to these agents. It can be applied also to some other crystalline synthetic resins and, for the improvement of the physical quality of coating, such as strength, some adequate synthetic resins, for example polyisobutylene may be added to said materials up to around 10% of the solvent, and if required, a slight quantity of coloring matter may be mixed to comply with the purpose intended.

As described the invention affords means to acquire resin coating layer with fine separated cells within it, by coating the wire under a certain amount of pressure and setting the proportion of mixture of solvent at less than 2.5 times of resin, when a cellular insulated wire coated with crystalline synthetic resin with higher molecular weight is to be manufactured.

The present invention, of which application is intended to be additional to the patent application Serial Number 810,569, affords a modified method of manufacturing wire insulated with a coating of solution, in which crystalline synthetic resin comprises its main component, by carrying out the coating process under pressure less than a normal atmospheric one, and by fixing the proportion of mixture of solvent at 2.5 times of the resin, when higher molecular weight resins, such as polyethylene processed after medium or low pressure methods, or polypropylene are to be employed for coating purpose.

Thus described, what we claim is:

Method of manufacturing insulated wire comprising passing the wire through a solution of synthetic resin of a molecular weight over 50,000 selected from the group consisting of polyethylene and polypropylene and a solvent the proportion by weight of solvent to resin being less than 2.5, under a pressure of the order of 50 to 80 grams per square centimeter, cooling the wire thus coated to a temperature below the gelation point of the resin solution, and reheating the coated wire to generate fine cells in the coating of a diameter of the order 10 to 30 microns.

References Cited in the file of this patent

UNITED STATES PATENTS 2,298,324    Williams _____ Oct. 13, 1942

FOREIGN PATENTS 1,006,918    Germany _____ Apr. 25, 1957
1,092,082    Germany _____ Nov. 3, 1960